United States Patent [19]

Müller

[11] Patent Number: 4,874,571
[45] Date of Patent: Oct. 17, 1989

[54] APPARATUS FOR CALENDERING PLASTIC WEB EXTRUDED FROM A SLOT DIE

[75] Inventor: Heinz Müller, Windeck, Fed. Rep. of Germany

[73] Assignee: Reifenhauser GmbH & Co. Maschinenfabrik, Troisdorf, Fed. Rep. of Germany

[21] Appl. No.: 142,466

[22] Filed: Jan. 11, 1988

[30] Foreign Application Priority Data

Jan. 31, 1987 [DE] Fed. Rep. of Germany ....... 3702945

[51] Int. Cl.$^4$ ............................................. B29C 47/90
[52] U.S. Cl. .................................. 264/175; 264/210.2; 264/211.13; 264/216; 264/237; 425/66; 425/72.1; 425/325
[58] Field of Search ................ 264/175, 144, 212, 216, 264/237, 210.2, 211.13; 425/72.1, 326.1, 325, 66

[56] References Cited

U.S. PATENT DOCUMENTS

| | | | |
|---|---|---|---|
| 3,277,227 | 10/1966 | Kesseler et al. | 425/72.1 |
| 3,429,959 | 2/1969 | Salhofer | 264/175 |
| 3,708,565 | 1/1973 | Seiffert | 264/175 |
| 3,981,952 | 9/1976 | Ruddell et al. | 264/175 |
| 4,056,592 | 11/1977 | Izumi et al. | 264/144 |
| 4,340,342 | 7/1982 | Kim | 264/144 |

FOREIGN PATENT DOCUMENTS

| | | | |
|---|---|---|---|
| 2129157 | 12/1971 | Fed. Rep. of Germany | 425/72.1 |
| 51-33144 | 9/1976 | Japan | 425/72.1 |
| 59-215824 | 12/1984 | Japan | 425/72.1 |
| 894147 | 4/1962 | United Kingdom | 425/72.1 |

Primary Examiner—Jeffery Thurlow
Attorney, Agent, or Firm—Herbert Dubno

[57] ABSTRACT

The invention relates to an apparatus for calendering a plastic web extruded from a slot die, and a method of operating this apparatus, the apparatus having at least two cooled rolls, which work in conjunction, the plastic web passing through the calendering nip between them. The plastic is particularly a partly crystalline type, notably polypropylene. The slot die is arranged above the first nip, and the plastic web passing through the nip continuously comes off the first roll and passes around the second roll at about 180° or more. Below the nip there is a blowing device for causing cooling gas to impinges along the entire width of the plastic web in the channel between the first roll and the plastic web coming off it.

15 Claims, 1 Drawing Sheet

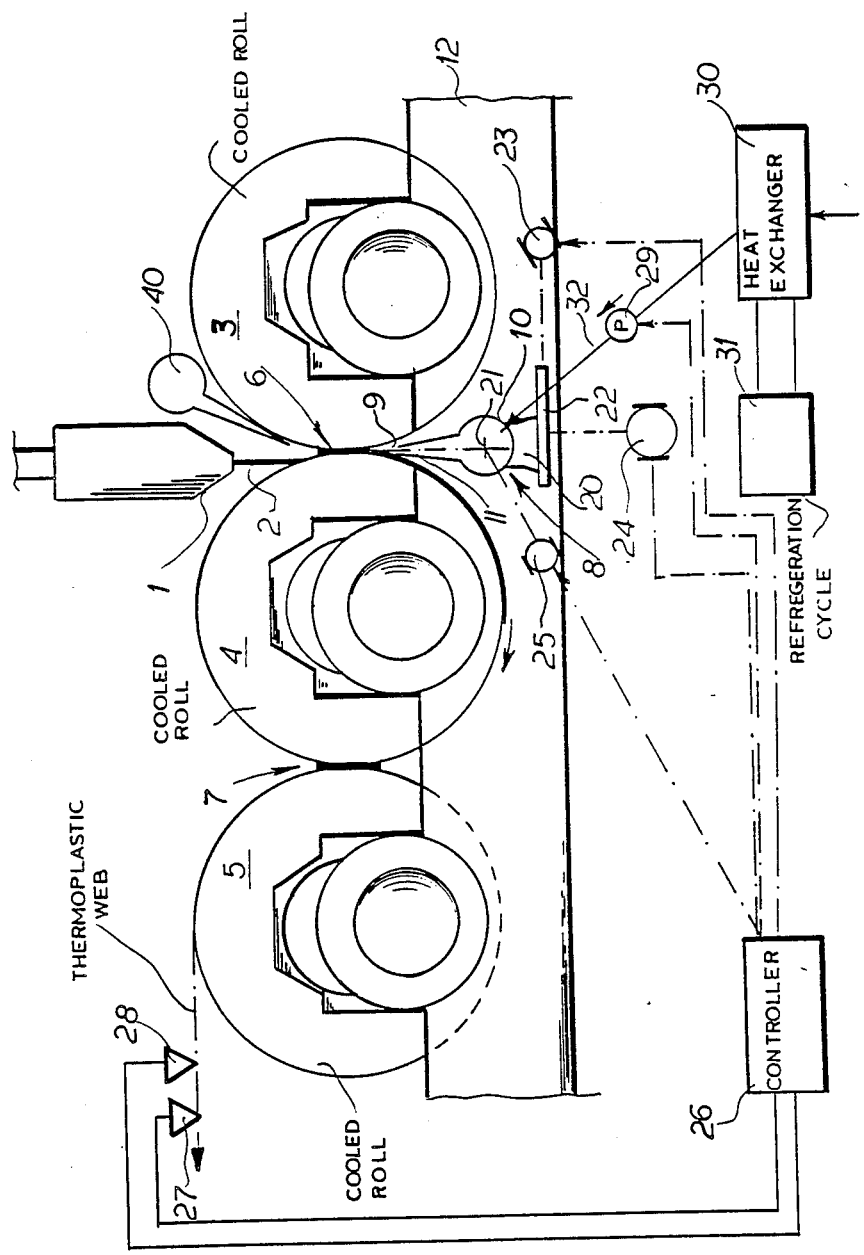

APPARATUS FOR CALENDERING PLASTIC WEB EXTRUDED FROM A SLOT DIE

FIELD OF THE INVENTION

My present invention relates to an apparatus for calendering plastic (synthetic resin) web coming from a slot die. The term web is meant herein to encompass the terms film and foil.

BACKGROUND OF THE INVENTION

The processing of partially crystalline thermoplastic resins is made difficult by the tendency of the resin to crystallize. The inherent properties of the plastic web produced, its degree of crystallinity and its morphological structure are all influenced strongly by the cooling process which is used. A high rate of cooling leads to a finely spherolitic structure, which results in relatively high transparency on account of greatly reduced light scattering. The influence of the cooling rate increases with decreasing crystallization rate, and for this reason, cooling rate is of great importance, with polypropylene for instance, as well as with other vinyl, styrenic or polyester resins that happen to be semicrystalline.

In known processes for calendering plastic web extruded from a slot die, the cooling rate is determined by the temperature of the cooled calendering roll, aside from the effect of the temperature of the surroundings. If the cooling rate thus determined is too low, then the finished plastic web loses its transparency Since the cooling rate decreases with increased roll speed, the roll speed must be limited and thus the production rate must be limited.

OBJECTS OF THE INVENTION

An object of the invention is to provide an improved apparatus for calendering plastic web coming from a slot die, wherein the roll speed and thus the production rate can be increased without affecting the transparency of the plastic web thus produced.

A further object is to provide an improved apparatus which affords plastic web of good surface quality and high gloss.

A further object is to provide a method for the production, at an enhanced rate and with smooth operation, of plastic web (including film) having high transparency and excellent surface characteristics.

SUMMARY OF THE INVENTION

The objects of the invention are achieved by providing an apparatus (and method of operation thereof) for calendering plastic web extruded from a slot die, this apparatus comprising at least two calendering rolls, wherein in the region of the calendering nip formed by the first two of these rolls there is a device for providing a cooling gas, this gas impinging along the length of the calendering nip between the first calendering roll and the plastic web coming off this roll. This positioning of the device for providing cooling gas is a critical feature of the invention.

In a preferred embodiment of the invention, the device for providing cooling gas comprises a blowing duct extending the breadth of the calendering roll, and having a slot aperture for the exiting gas. It will be understood that the blowing device, for example for fitting to various web thicknesses, can be made positionable in two axes and turnable.

Within the scope of the invention, it is possible to use basically any cooling gas. In general, however, cool air works very well. The temperature of the cooling gas need not be very low; for many purposes, a temperature of about 10° to 15° C. is adequate. For special requirements however, it is also possible to work with substantially cooler gas.

The cooling of the gas can be done using a heat exchanger attached to a suitable refrigeration machine. The cooling gas is generally propelled with a blower. In this regard, it is especially advantageous for reasons of simplicity to have the blowing device in conformity with the invention connected to a thermodynamic vortex device as a source for the cooled gas. Thermodynamic vortex devices are already known (for instance, see Lueger, "Lexicon der Technik," Vol. 16, Lexikon der Verfahrenstechnik, 1970, p. 584).

Surprisingly, by using the apparatus and method of the invention, no further changes are required in order to operate at an elevated rate of production, twice as fast as hitherto possible or even faster, without affecting the final product adversely in regard to transparency. The production increase depends on the cooling gas quantity and temperature.

The invention is based on the fact that the plastic web beyond the calendar nip still has a relatively high temperature. In the prior art processes, the plastic web therefore tends to adhere to the first calendering roll even after it has left the region of contact in the calendering nip. This means that the web either does not lie against the second roll in this region, or does so only with entrapment of air. That situation adversely affects the heat transfer between the plastic web and the second roll which is necessary for cooling.

In accordance with the invention, the cooling gas simultaneously helps lift the plastic web from the first roll and presses it against the second roll. By virtue of the better contact to the second roll, the cooling velocity of the plastic web is increased; moreover, the cooling gas itself contributes to this effect. As a result, much more rapid cooling of the web is achieved and this results in actually improved transparency.

Since in the method and apparatus of the invention the line of release of the web from the first roll is sharply defined, the plastic web runs very smoothly through the first calendering nip. This stabilization of operation can even be further improved by having an additional blowing device for cooling gas at the entrance side of the calendering nip, the gas being directed, all along the length of the roll, at least onto one side of the channel between one of the calendering rolls and the plastic web or onto the plastic web itself. In this way, the apparatus of the invention can be operated with minimal bead or bank of polymer ahead of the first nip, thus with minimum marking caused by this bead, and with reduced pressure between the rolls. Moreover, the surface gloss of the plastic web and the final plastic web or film is actually improved on both sides.

BRIEF DESCRIPTION OF THE DRAWING

The above and other objects, features and advantages of the invention will become more readily apparent from the following description, reference being made to the accompanying drawing in which the sole FIGURE is a side view of an apparatus in accordance with the invention.

SPECIFIC DESCRIPTION

The apparatus shown in the FIGURE serves to calender a plastic web 2 coming from a slot die 1, this web being formed from a partly crystalline thermoplastic resin. The web 2, for example, could consist of polypropylene.

The apparatus has three cooled calendering rolls 3, 4 and 5. The rolls 3,4 and 5 work in conjunction with each other, i.e. counterrotating in the usual manner of a calender, with interposition of the web 2, and these rolls form the corresponding calendering nips 6 and 7. The slot die is positioned above the first of the calendering nips 6 and 7. The plastic web 2 coming downward out of the slot die comes off continuously from the first roll 3 of the calendering rolls 3, 4 and 5, and thereafter is threaded around the second roll 4 of the calendering rolls 3, 4 and 5 which is at about 180° C or higher. For further calendering, the web then proceeds through nip 7 formed by rolls 4 and 5. It may then be further calendered, embossed, taken up on a roller, slot, printed, laminated, or otherwise further processed, e.g. deep drawn, these further steps being beyond the ambit of the invention.

Below the first calendering nip 6 there is a blower device 8 for cooling gas which impinges along the length of the calender nip 6 in the channel 9 between the first calendering roll 3 and the plastic web 2 coming off this roll. In the present example, the blowing device 8 consists of a blowing duct 10 extending over the breadth of the calendering rolls 3 and 4, this duct having a lengthwise slot aperture 11 for the exiting cooling gas. The cooling gas can be air, for example.

It will be understood that rolls 3, 4 and 5 are supported on a mounting means, typically a frame 12 with bearings, which in itself can be of known type. The blowing device can be mounted on the same mounting means or on a separate mounting means, the only requirement being that it is to be positioned as described above.

The method of operation of the above described apparatus is to adjust the rate of flow (quantity) of cooling gas so that the plastic web coming off the first roll releases at a sharply defined line, rather than sticking to the roll, and presses firmly against the second roll. Adjustments are advantageously made so that the final calendered web or film has optimal transparency.

It will be obvious that a technician or operator of ordinary skill can increase the flow until these operating conditions are met; the exact flow and temperature in any given case being a function of rate of operation, temperature of extrusion, temperature of the roll, surface area of the roll, thickness of the web, ambient temperature, and other such variables. It is advantageous that the cooling gas flow be kept low enough not to cause the web, in the case of polypropylene, to be substantially cooler than 180° C. when it reaches the second roll, or the calendering may be insufficient.

In general, the cooling gas, such as air, is set at about 15° C. or somewhat cooler.

In the drawing, I have shown the blowing duct 10 to be mounted on a support 20 which enables it to be rotated about its axis 21 to adjust the angular orientation of the jet 9 with respect to the nip 6. In addition, the support 20 can be shifted to the left or right on the guide 22 by the motor 23 while another motor 24 serves to raise and lower the guide on the frame 12. The angular position is controlled by a motor 25.

The motors 23–25 are actuated by a controller 26, e.g. a microcomputer, having an input from a thickness sensor 27 which thus causes automatic readjustment of the blowing duct. A detector 28 can be utilized to provided an input to the microcomputer 26 to control the blower 29 which received the air to be fed to the nozzle 10 from an indirect heat exchange with a refrigerant circulated in a refrigerant cycle 31. The output from the blower 29 is fed to the blowing duct 10 via a vortex device 32, here represented only as a line, constituted as described in Lueger "Lexikon der Technik", Op. C.T. Another blowing duct, i.e. nozzle 40, which can be similarly controllable, can be provided at the input side of the nip.

I claim:

1. An apparatus for calendering a plastic web extruded from a slot die, said apparatus comprising at least two cooled calendering rolls said rolls operating in conjunction with each other and together defining a calendering nip, said slot die being positioned on one side of said calendering nip, said plastic web continuously coming off the first of said rolls and being threaded around the second of said rolls, and having in the region of said calendering nip a blowing device for cooling gas, said blowing device providing cooling gas along the length of said calendering nip into the channel between the first of said rolls and the plastic web coming off the roll, and said blowing device being a blowing duct extending the breadth of said calendering rolls, and having a slot aperture for said cooling gas.

2. An apparatus as defined in claim 1 wherein said plastic web comprises a semicrystalline thermoplastic.

3. An apparatus as defined in claim 1 wherein said plastic web is polypropylene.

4. An apparatus as defined in claim 1 wherein said cooling gas is air.

5. An apparatus as defined in claim 1 where said blowing device is provided with a thermodynamic vortex tube for cooling said gas.

6. An apparatus as defined in claim 1 which is provided with a further blowing device for cooling gas on the entrance side of said calendering nip, such that said cooling gas impinges along the length of said calendering nip onto at least one side of the channel between one of said calendering rolls and said plastic web or onto said plastic web.

7. A cooling means for plastic web extruded from a slot die and passing through a nip between two calender rolls, which comprises a blowing device having aperture means to impinge a cooling gas along the entire breadth of said web and positionable so as to impinge said cooling gas into the channel between said plastic web and the first of said calender rolls.

8. A cooling means as defined in claim 7 wherein the aperture is a slot.

9. A cooling means as defined in claim 7 wherein the blowing device is attached to a thermodynamic vortex device as the means for cooling the gas.

10. A cooling means as defined in claim 7 wherein the blowing device is positionable in two dimensions and rotatable with respect to said plastic web so as to be adaptable to plastic web of differing thicknesses.

11. A method for calendering a plastic web comprising the steps of:
    extruding a plastic through a slot die to form said plastic web;
    directing said extruded plastic web into a calendering nip formed between a first and a second cooled calendering roll and operating said rolls in relative counterrotation, said slot die being positioned on one side of said rolls;

threading said plastic web continuously coming off the first calendering roll around the second calendering rolls; and blowing cooling gas from a blowing device along the length of said calendering nip into a channel between the first of said rolls and the plastic web coming off the roll.

12. A method as defined in claim 11 wherein said cooling gas is impinged at such temperature and quantity that said plastic web comes off of said first roll at a sharply defined line and is pressed firmly against said second roll substantially without entrapment of air.

13. A method as defined in claim 11 wherein said cooling gas is at about 10° to 15° C.

14. A method as defined in claim 11 wherein said cooling gas is air.

15. A method as defined in claim 11 wherein said cooling gas is cooled by a thermodynamic vortex device.

* * * * *